US012376216B2

(12) United States Patent
David et al.

(10) Patent No.: US 12,376,216 B2
(45) Date of Patent: Jul. 29, 2025

(54) LIGHT FIXTURE CONNECTABLE TO A TELECOMMUNICATION NETWORK

(71) Applicant: LUCIBEL SA, Barentin (FR)

(72) Inventors: Thibault David, Saint Maurice (FR); Pierre Granotier, Le Mesnil le Roi (FR); Alexis Deboos, Le Vaudreuil (FR)

(73) Assignee: LUCIBEL SA, Barentin (FR)

( * ) Notice: Subject to any disclaimer, the term of this patent is extended or adjusted under 35 U.S.C. 154(b) by 65 days.

(21) Appl. No.: 18/547,278

(22) PCT Filed: Feb. 15, 2022

(86) PCT No.: PCT/FR2022/050277
§ 371 (c)(1),
(2) Date: Aug. 21, 2023

(87) PCT Pub. No.: WO2022/175628
PCT Pub. Date: Aug. 25, 2022

(65) Prior Publication Data
US 2024/0130027 A1     Apr. 18, 2024

(30) Foreign Application Priority Data
Feb. 22, 2021 (FR) .................................... 21 01711

(51) Int. Cl.
H05B 47/19     (2020.01)
H04B 10/114    (2013.01)
H04B 10/116    (2013.01)

(52) U.S. Cl.
CPC ......... *H05B 47/19* (2020.01); *H04B 10/1143* (2013.01); *H04B 10/116* (2013.01)

(58) Field of Classification Search
CPC .... H05B 47/19; H04B 10/1143; H04B 10/116
See application file for complete search history.

(56) References Cited

U.S. PATENT DOCUMENTS 10,222,474 B1 *  3/2019  Raring ................ H01S 5/02212
10,763,966 B1 *  9/2020  Deb ................. H04B 10/25759
(Continued)

FOREIGN PATENT DOCUMENTS

WO  WO-2019173543 A1 *  9/2019 ........... H04B 10/116
WO  WO-2020102491 A1 *  5/2020
(Continued)

OTHER PUBLICATIONS

International Search Report issued Jun. 13, 2022 in PCT/FR2022/050277, filed on Feb. 15, 2022, 2 pages.

*Primary Examiner* — Adam D Houston
(74) *Attorney, Agent, or Firm* — Oblon, McClelland, Maier & Neustadt, L.L.P.

(57) ABSTRACT

A light fixture defines a first optical path of propagation of a beam of visible light through the interior of a receptacle between a light source and a lighting window, and a second optical path of propagation of a beam of infrared light through the interior of the receptacle to the lighting window with a view to forming a two-way Li-Fi channel for communication of data. The light fixture further includes an optical component that is spectrally selective between the visible and infrared spectra, the component being placed at an intersection of the two optical paths, and being configured to transmit the light beam propagating along one of the optical paths and to reflect the other light beam propagating along the other of the optical paths in order to combine the two, visible and infrared, light beams between the optical component and the lighting window.

11 Claims, 5 Drawing Sheets

(56) References Cited

U.S. PATENT DOCUMENTS

| | | | |
|---|---|---|---|
| 11,800,261 B1* | 10/2023 | Rofougaran | H04B 10/114 |
| 12,209,746 B2* | 1/2025 | Van Der Lubbe | |
| | | | G03B 21/2013 |
| 2017/0141154 A1 | 5/2017 | Cha et al. | |
| 2018/0316160 A1* | 11/2018 | Raring | H01S 5/02257 |
| 2019/0323663 A1* | 10/2019 | Rudy | H01S 5/0233 |
| 2021/0048171 A1* | 2/2021 | Parker | F21V 14/06 |
| 2021/0194206 A1* | 6/2021 | Raring | H01S 5/02469 |
| 2023/0050177 A1* | 2/2023 | Grieder | H01S 5/005 |
| 2024/0130027 A1* | 4/2024 | David | H05B 47/19 |

FOREIGN PATENT DOCUMENTS

| | | | | |
|---|---|---|---|---|
| WO | WO-2020169382 A1 * | 8/2020 | | G06T 7/73 |
| WO | WO-2020257505 A1 * | 12/2020 | | F21K 9/00 |
| WO | WO-2022175628 A1 * | 8/2022 | | H04B 10/1143 |

* cited by examiner

LIGHT FIXTURE CONNECTABLE TO A TELECOMMUNICATION NETWORK

The present invention relates to the field of lighting, and more particularly relates to a light fixture adapted to form an optical relay for transmitting data in a telecommunication network such as the Internet.

It applies particularly, but not exclusively, to a lighting tile for a false ceiling enabling wireless communication by light with a remote terminal according to a wireless communication protocol. The invention is particularly well suited to lighting interior rooms of professional buildings.

In order to light a room, such as, for example, an office or a corridor, it is known to mount lighting tiles, also called illuminating panels, in a false ceiling attached under the ceiling of the room. To this end, the false ceiling comprises, in a known manner, a structure comprising small beams whose cross section is for example H-shaped, arranged according to a horizontal grid and whereupon opaque panels and lighting tiles are ordinarily mounted. Each lighting tile comprises for example a square-shaped frame which is mounted on the beams and inside which the lighting elements are mounted.

The present invention relates to a tile or such a panel suitable for transmitting or receiving a stream of digital data according to a wireless communication protocol of the "Li-Fi" type.

A wireless communication protocol allows the wireless connection of several computing devices within a computer network in order to allow the transmission of data therebetween.

Mention may be made, as a wireless communication protocol known from the prior art, of "Wi-Fi" governed by the standard "IEEE 802" relating to local networks based on the transmission of digital data. Wi-Fi in particular allows the creation of a wireless local area network having a transmission rate of about 1 gigabit per second, over a radius of several tens of meters, using the radio waves of the electromagnetic spectrum.

Another wireless digital communication technique known from the prior art is that based on "Li-Fi" technology, abbreviated from "Light Fidelity," which consists in using the optical part of the electromagnetic spectrum (visible or infrared spectrum) instead of radio waves used in the context of Wi-Fi, to digitally broadcast multimedia content such as music or a video, for example through the Internet.

Communication according to the Li-Fi protocol consists in modulating the light intensity of a light-emitting diode source (frequently referred to by the acronym "LED") connected to the Internet. The switching capacities between an "on" state and an "off" state of an LED can range up to a billion times per second, which makes the state changes of these LEDs undetectable by the human eye.

According to a simplified explanation, a series of on and off states of an LED allows the creation a digital stream corresponding to the input signal received by the light fixture connected to the Internet. The switching capacity of LEDs at a very high frequency allows the transmission of sound, images, videos, or the display of the content of a web page on a digital communication terminal adapted to receive data such as Li-Fi data.

The Li-Fi communication technique has multiple advantages relative to the Wi-Fi communication technique.

Among these advantages, mention may in particular be made of the speed of data transmission by Li-Fi, which is much greater than that reached by WI-Fi technology in that it can reach a speed greater than a gigabit per second; the fact moreover that no radio wave, whose health effects are still uncertain, is transmitted; and finally, the absence of interference between the radio waves and the absence of electromagnetic interference.

In addition, the Li-Fi communication protocol advantageously makes it possible to reduce congestion on the 2.4 GigaHertz frequency band used to date by almost all wireless communication protocols.

Additionally, the applications of the Li-Fi communication technology are numerous. By way of example, this technology can be used in public places or areas, such as roadways, parks, museums, train stations, etc., or private areas, such as stores, but also in professional environments. For example, owing to Li-Fi technology it is possible to combine both the lighting of a painting in a museum and the broadcasting of content relating to this painting.

There is therefore a need to develop various shape factors of light fixtures connectable to a network according to Li-Fi technology that make it possible to respond to various applications already covered by conventional lighting apparatuses.

The integration of Li-Fi technology according to different lighting apparatus shape factors may prove to be particularly complex, or even unsuitable. Indeed, to integrate Li-Fi technology, it is necessary to provide a location in the light fixture to receive the Li-Fi module. This Li-Fi module generally consists of a Li-Fi transmitter and a Li-Fi receiver and forms a relatively bulky electronic component, its integration into the lighting apparatus being the source of new sizing constraints.

In particular, integrating Li-Fi technology into a lighting panel is particularly complex due to the reduced thickness of the panel. Additionally, the lighting panels must provide homogeneous light with little energy consumption, which criteria are difficult to observe once the lighting source operates according to Li-Fi technology.

Also known from the prior art, in particular from patent application FR3077619A1, is a lighting panel integrating Li-Fi technology. The panel comprises, on a light emission front wall, cladding areas extending in line with the electronic components constituting the generic Li-Fi module for masking them. Although the electronic components of the Li-Fi module are thus made invisible, the fact remains that the presence of the cladding areas breaks the homogeneity of the surface lighting of the lighting panel.

One aim of the present invention is to provide a light fixture suitable for the two-way communication of data by light according to Li-Fi technology not having the disadvantages of the prior art.

To this end, the invention relates in particular to a light fixture suitable for the two-way transmission of data by Li-Fi, of the type comprising a receptacle delimiting the exterior dimensions of the light fixture provided with a front wall comprising a lighting window and an illuminating light source in the visible spectrum, the light fixture defines a first optical path of propagation of a beam of visible light through the interior of the receptacle between the light source and the lighting window, characterized in that the light fixture defines a second optical path of propagation of a beam of infrared light through the interior of the receptacle to the lighting window to form a two-way Li-Fi channel for transmission of data, and in that the light fixture further comprises an optical component that is spectrally selective between the visible and infrared spectra, placed at an intersection of the two optical paths, this component being configured to transmit the light beam propagating along one of said optical paths and to reflect the other light beam propagating along the other of said optical paths in order to combine the two visible and infrared light beams between the optical component and the lighting window.

Thus, because the visible and infrared light beams combine between the optical component and the lighting window, a user receives the reflected visible light beam in an area of the lighting window located in line with a Li-Fi module for transmitting/receiving a downlink or uplink infrared signal. He therefore does not perceive any inhomogeneity of the surface lighting in the lighting window associated with this two-way data transmission area In another embodiment of the invention, the optical component comprises an optical filter having the property of allowing a light beam in the infrared spectrum to pass and of reflecting a light beam in the visible spectrum, the optical component in particular being a dichroic plate or a dichroic mirror. The filter is for example a high-pass optical filter which predominantly reflects a light beam having a wavelength below a predefined cutoff wavelength and predominantly transmits a light beam having a wavelength above the cutoff wavelength. For example, the cutoff wavelength is greater than 750 nanometers, e.g. equal to about 780 nanometers.

In another embodiment of the invention, the optical component has an optically structured surface for dispersing optical rays of the reflected light beam so as to promote the redirection of the optical rays toward the lighting window.

In another embodiment of the invention, the light fixture forms an optical relay for two-way data transmission between a Li-Fi module suitable for transmitting and/or receiving an infrared light beam modulated by data to be transmitted and a remote terminal; the light fixture delimits a location, extending inside and/or outside the receptacle configured for receiving the Li-Fi module, said location being placed upstream of the optical component on the second optical path considering the downlink direction.

In another embodiment of the invention, the light fixture comprises a reflector arranged in the receptacle on the first optical path configured to reflect in the visible spectrum mainly in the direction of the lighting window, the optical component extending in a region of the receptacle located substantially at the intersection of the two optical paths so that, in this region, the visible light beam propagating along the first optical path is reflected predominantly by the optical component and the infrared light beam propagating along the second optical path is transmitted predominantly by the optical component.

In another embodiment of the invention, the receptacle having a general panel shape, the light source is placed inside the panel to illuminate through the panel along an edge face of a peripheral wall of the panel and the reflector forms a back wall of the panel with which the optical component is coupled in the intersection region.

In another embodiment of the invention, in the intersection region, the reflector is provided locally with a recess configured to receive the optical component.

In another embodiment of the invention, the light source and the optical component are placed on a back wall of the receptacle, the receptacle comprising a substantially reflective inner surface forming the reflector, so that the first optical path comprises a plurality of reflections on the reflective inner surface of the receptacle toward the back wall and the second optical path extends directly between the back wall and the front wall.

In another embodiment of the invention, the first optical path is indirect with a plurality of optical reflections and the second optical path is direct without optical reflections, for example by extending substantially rectilinearly between a back wall and a front wall of the light fixture.

In another embodiment of the invention, the optical component is provided with a surface reflecting the visible light and is arranged on a back wall opposite the front wall, so that the optical component passes through the thickness of the back wall and has the surface on the side of an inner face of the back wall.

In another embodiment of the invention, the light fixture comprises a diffuser for diffusing the visible light through the lighting window, said diffuser being locally perforated in an area of intersection of the diffuser with the second optical path.

The invention further relates to a Li-Fi data communication assembly comprising a light fixture according to the invention and a Li-Fi module suitable for transmitting and/or receiving an infrared light beam modulated by data to be transmitted comprising a connector connecting the module to an external communication network, such as the Internet, characterized in that the Li-Fi module extends upstream of the optical component along the second optical path considering a downlink direction between the Li-Fi module toward a remote terminal.

Other features and advantages of the invention will become apparent in light of the following description, done with reference to the attached drawings, wherein.

Figure 7:
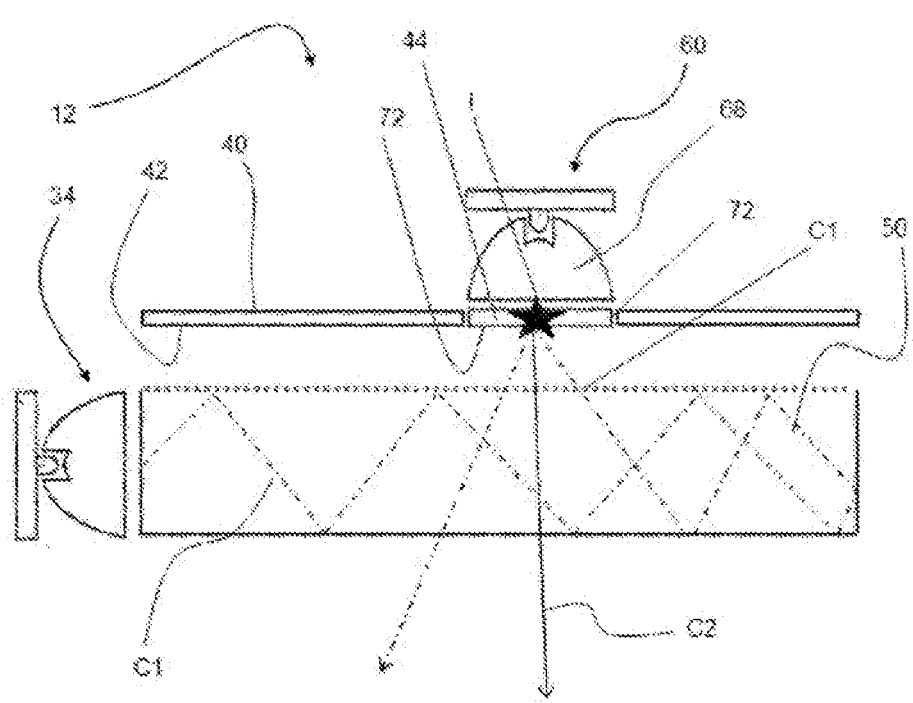
Figure 8:
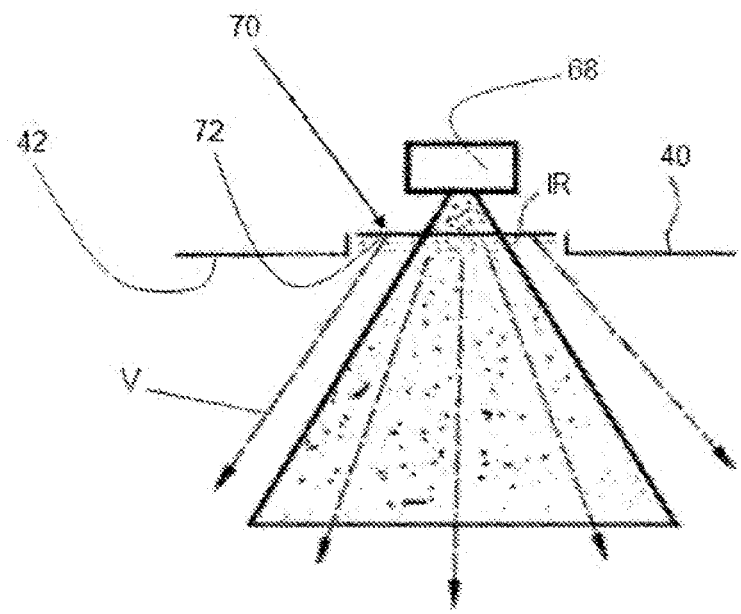
Figure 9:
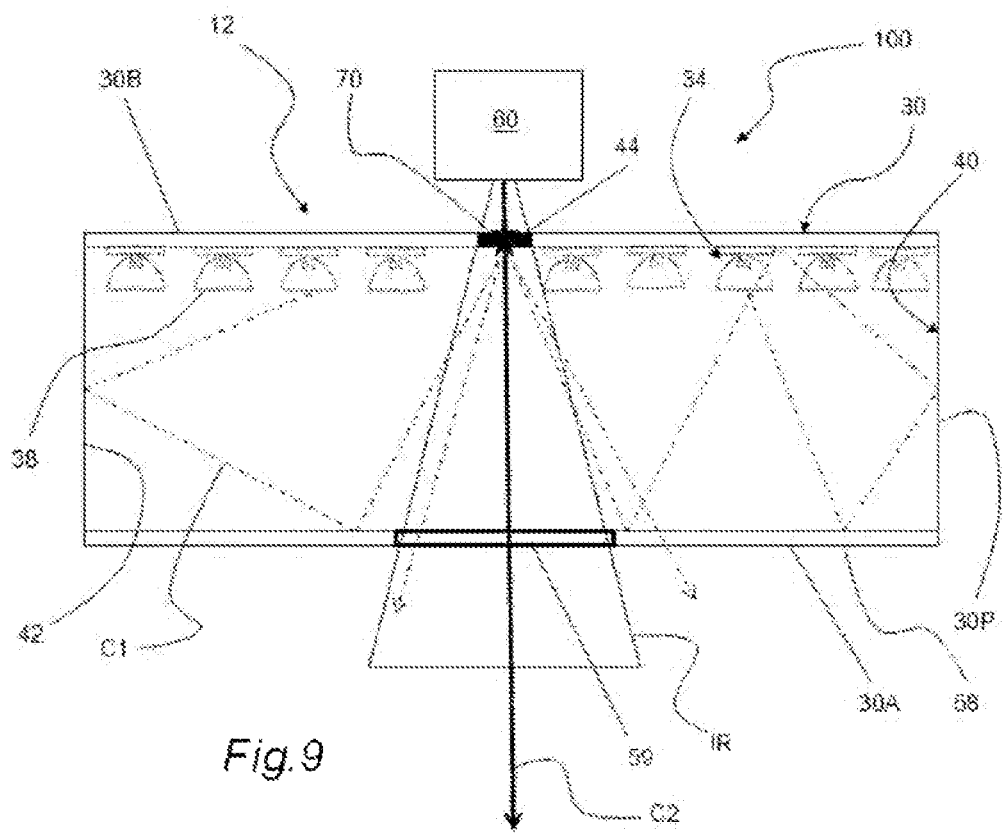

FIG. 7 schematically shows the operating principle of an optical component of the light fixture according to the first embodiment of the invention;

FIG. 8 schematically shows, on an enlarged scale, the operating principle of the optical component of the light fixture according to the first embodiment of the invention;

FIG. 9 is a cross sectional view of a light fixture according to a second embodiment of the invention.

Figure 1:
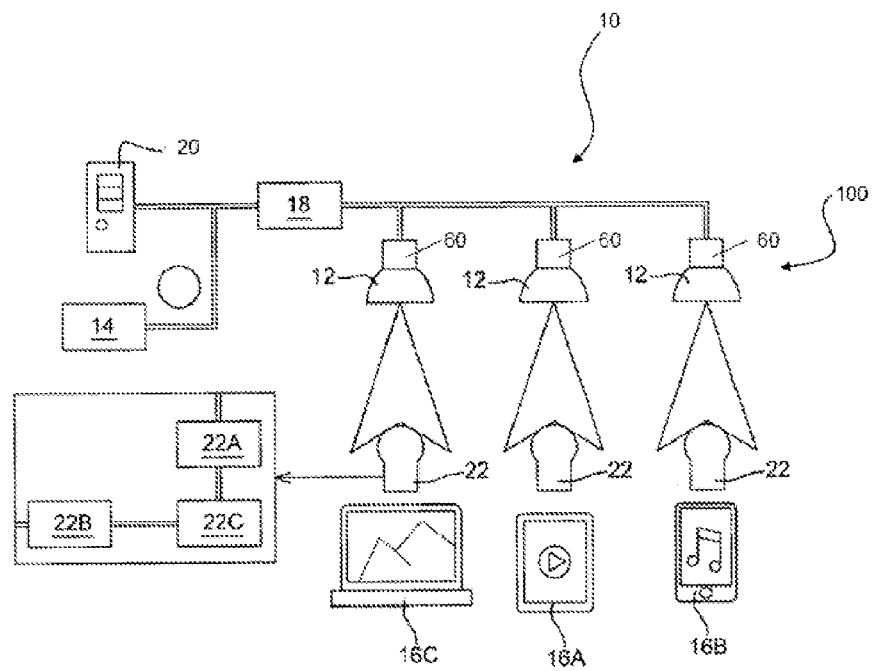
FIG. 1 shows a functional diagram of a Li-Fi architecture comprising a Li-Fi communication assembly according to the invention.

FIG. 1 schematically shows a Li-Fi architecture for Li-Fi communication comprising a Li-Fi communication assembly according to the invention for transmitting data by light with a remote terminal. This Li-Fi architecture is designated by general reference 10 and the communication assembly is designated by general reference 100.

Within the meaning of the present invention, "optical path" will be understood to mean the path(s) according to which a light beam can propagate in an optical system between two points. The path is said to be direct when the light beam is not reflected and the path is said to be indirect when the light beam undergoes one or more reflections.

The communication assembly 100 comprises a light fixture 12 and a Li-Fi module 60, which will be described in detail below.

In FIG. 1, three light fixtures 12 are shown. In the remainder of the description, only one of the three light fixtures will be described.

According to the invention, the light fixture 12 is part of the wireless communication assembly 100 connectable to a telecommunication network 14. The telecommunication network 14 may comprise an Internet network, an Intranet network, an Ethernet network or any other type of communication network.

In this example, the telecommunication network is the Internet and the network communication protocol is the TCP/IP communication protocol.

In a manner known per se, the Internet is a global computer network representing the interconnection between a plurality of remote servers. The Internet 14 may comprise a plurality of associated services such as a Web service, a messaging service, a peer-to-peer file sharing service, a videoconferencing service. Generally, these various services communicate for example with the TCP/IP protocol.

Of course, as a variant, the wireless communication assembly 100 can be connected to a local Intranet network represented by a local server 20 in FIG. 1.

In the example described, the remote terminal 16 is an electronic tablet 16A. Alternatively, the remote terminal 16 may be a cell phone 16B, or a work computer 16C, etc.

In the example described, the communication assembly 100 is able to perform the communication of data with the remote terminal 16 according to a theoretical flow rate greater than a gigabit per second, preferably greater than seven gigabits per second.

Generally, as is schematically shown in the example of FIG. 1, each remote terminal 16 is equipped with a Li-Fi key 22 (referred to as a "dongle"). The Li-Fi key 22 comprises, in the example shown, a photoreceiver 22A for receiving a data signal from the light fixtures 12, a unit 22B for emitting a data signal generated from the terminal 14 and a unit 22C for processing the data signals transmitted or received.

The wireless communication assembly 100 shown in FIG. 3 will now be described in more detail. This assembly 100 comprises a light fixture 12 according to a first embodiment and a Li-Fi module 60.

FIGS. 2 to 5 show the light fixture 12 according to a first embodiment of the invention in more detail. This light fixture 12 comprises a receptacle 30 delimiting the exterior dimensions of the light fixture. This light fixture 12 is provided at the front of a front wall 30A comprising a lighting window 32 and a light source 34 for lighting in the visible spectrum, housed inside the receptacle 30.

In the example shown, the light fixture 12 is a lighting panel and the receptacle 30 delimits the exterior dimensions of the light fixture 12 in a general quadrilateral shape, for example square or rectangular. In a variant that is not shown, the light fixture 12 may have a shape factor different from a light tile or panel and the receptacle may have a general cylindrical, tubular, etc. shape, without departing from the scope of the invention.

In the example shown, the panel 12 comprises a front lighting face 12A intended to be oriented toward the floor and a rear face 12B intended to be oriented toward the support to which the panel 10 is intended to be attached, for example a ceiling.

In this example, the panel 12 further comprises, at the rear, a back wall 30B opposite the front wall 30A which is generally either intended to extend inside a false ceiling opening or intended to be attached directly to the ceiling, or suspended by wires. Furthermore, the panel 10 further comprises a peripheral wall or peripheral edge 30P interconnecting the two front walls 30A and back walls 30B. Thus, in the example shown, the receptacle 30 of the panel 12 delimits a housing, for example of generally square shape.

Within the meaning of the present invention, panel or tile is understood to mean a product; therefore, the width and length are of the same order of magnitude, this order of magnitude being much greater than that of the height.

The panel may optionally have curved, concave or convex front rear faces. In the example shown, the panel 12 has a generally square shape, but of course the panel can alternatively be round, oval, rectangular or polygonal in shape.

In the example shown, the peripheral wall 30P of the receptacle 30 a peripheral frame 31 made of aluminum, for example formed by the combination of aluminum profiled elements.

According to the invention, the light fixture 12 defines, inside the receptacle 30 between the light source 34 and the lighting window 32, a first optical path C1 for propagating a beam of visible light V, emitted by the light source 34.

For the purposes of the invention, visible light is understood to mean a light with wavelengths between about 450 nanometers and 750 to 800 nanometers.

Figure 2:
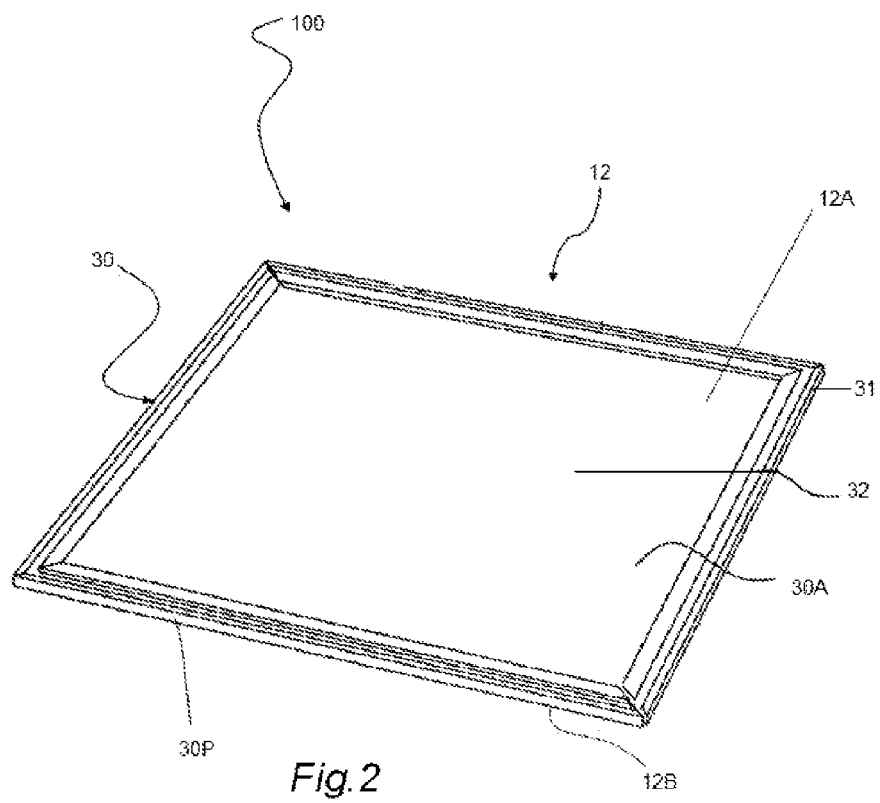
FIG. 2 is a perspective view of a front face of a light fixture according to a first embodiment of the invention of the Li-Fi communication assembly of FIG. 1.

In FIG. 2, it can be seen that the front wall 30A generally delimits the lighting window 32 in a general plate shape.

In the preferred embodiment of the invention, the first optical path C1 is an indirect or reflected optical path and comprises at least one optical reflection.

Thus, preferably, the light fixture 12 comprises a reflector 40 arranged in the receptacle 30 on the first optical path C1 and provided with a reflective inner surface 42 in the receptacle 30 configured to reflect in the visible spectrum predominantly in the direction of the lighting window 34. In the example shown, the reflector 40 has a general plate shape and forms the back wall 30B of the panel 12.

Figure 3:
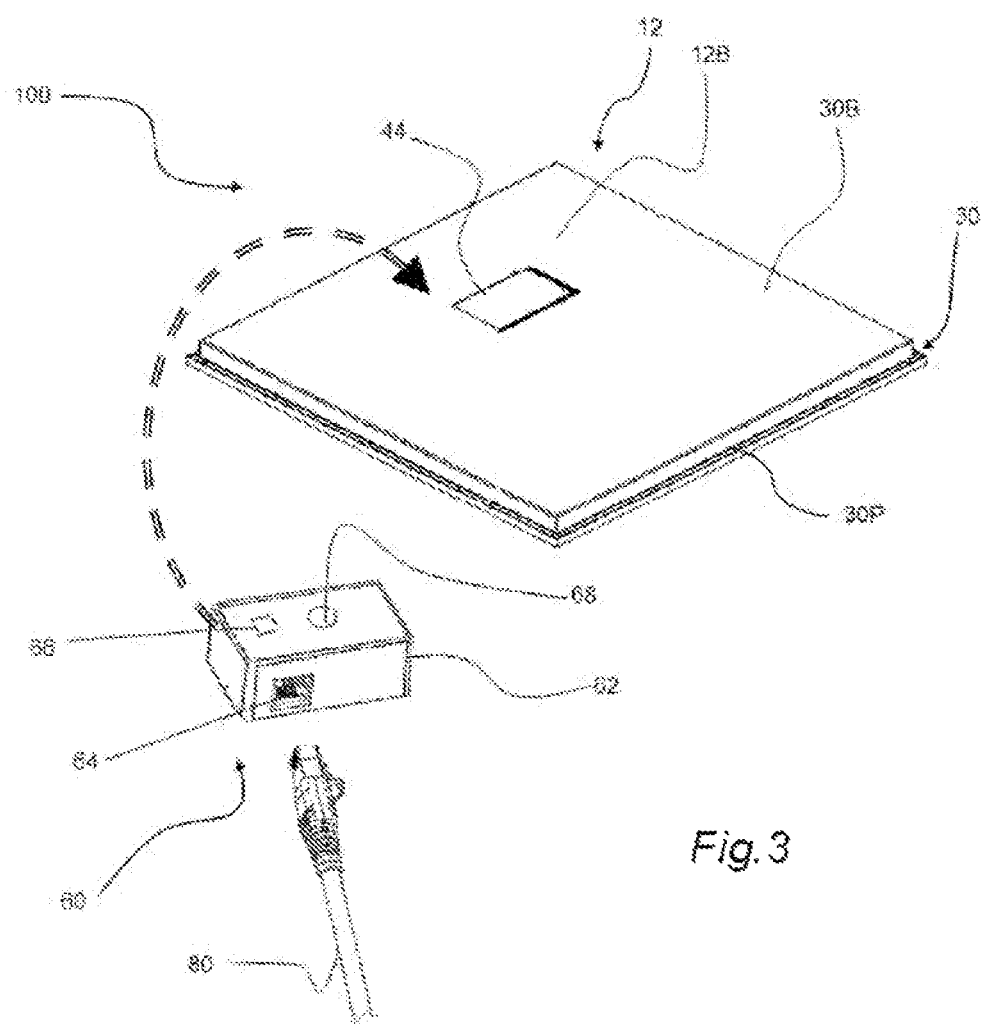
FIG. 3 is a perspective bottom view of the light fixture of FIG. 2 and a Li-Fi module to form the Li-Fi communication assembly according to the invention.
Figure 4:
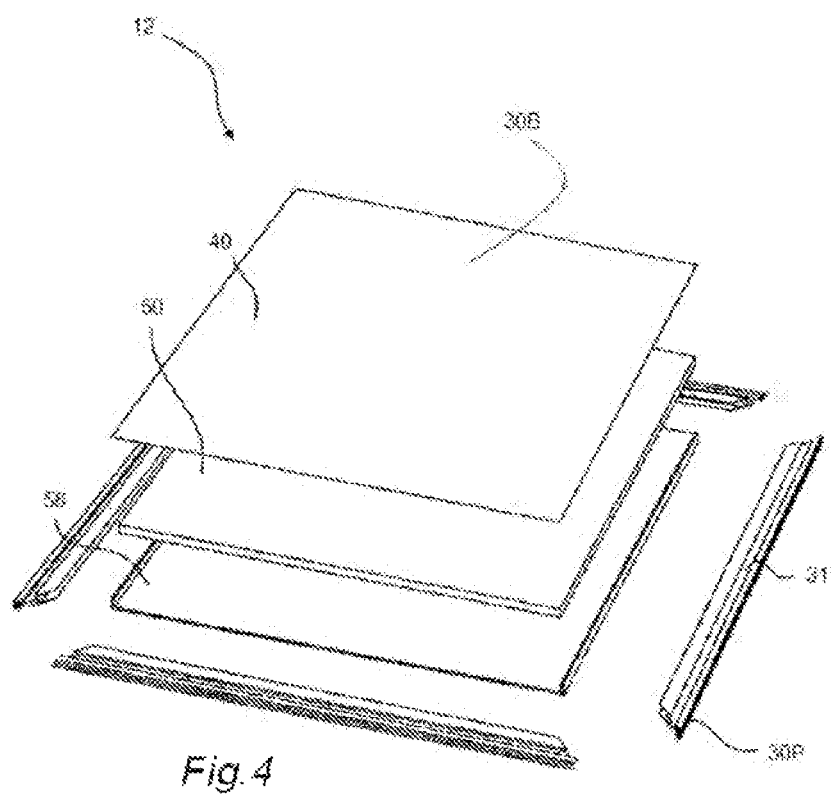
FIG. 4 is a perspective view in the disassembled state of the light fixture of FIGS. 2 and 3.

In FIG. 3, preferably, the light source 34 is arranged inside the panel 12 to illuminate through the panel 12 along an edge face of a peripheral wall 30P of the panel 12.

Additionally, the light fixture 12 then comprises, along the first optical path C1, upstream of the reflector 40, a guide 50 for guiding the light beam V emitted by the light source 34 in a transverse direction of the panel 12 by multiple reflections inside the guide 50 and configured to allow the light to exit the guide 50 toward the reflector 40.

Preferably, the guide 50 is for example in the form of a guide plate. Preferably, the light source 34 comprises a plurality of light-emitting diodes 38, arranged for example in the form of one or more arrays 36 of light-emitting diodes 38, such as that shown in FIG. 5. The array of diodes 36 may for example be placed on an edge face of the peripheral edge 30P of the panel 12.

For example, the panel 12 may comprise a single array 36 of light-emitting diodes 38. In this case, opposite the array 36 of light-emitting diodes 38, a reflective strip 39S is affixed for example by adhesion on the opposite edge face 39 of the panel 12.

Optionally, the panel 12 may comprise more than one array of light-emitting diodes, for example two arrays arranged on two opposite sides of the panel 12.

Additionally, for example, in order to allow light to exit outside the guide 50, preferably, the guide plate 50 comprises a whole series of light exit points 56 which are distributed on a face 50B of the guide plate 50 arranged opposite the reflector 40. This series of points for example has a distribution in the form of a network formed on one of the faces of the guide plate 50, here the back face 50B.

Advantageously, the distribution of points 56 is such that the light that exits the optical guide plate 50 has a uniform intensity over the entire surface of the panel 12.

These points 56 may for example be formed by openings made in the guide plate 50 or by scratches or any irregularities allowing an exit from the light guide 50. The light emitted along one of the edge faces of the guide plate 50 is guided inside the optical guide by multiple reflections and able to exit the guide plate 50 through these points 56.

This series of points 56 may for example be formed by a flexible polymer coating bonded directly to one of the faces 50B of the guide plate 56. In this case, the distribution of the points 56 may be symmetrical relative to a vertical plane comprising an axis passing through the middle of the panel 12, with the aim of ensuring a globally uniform distribution of the light intensity.

Figure 5:
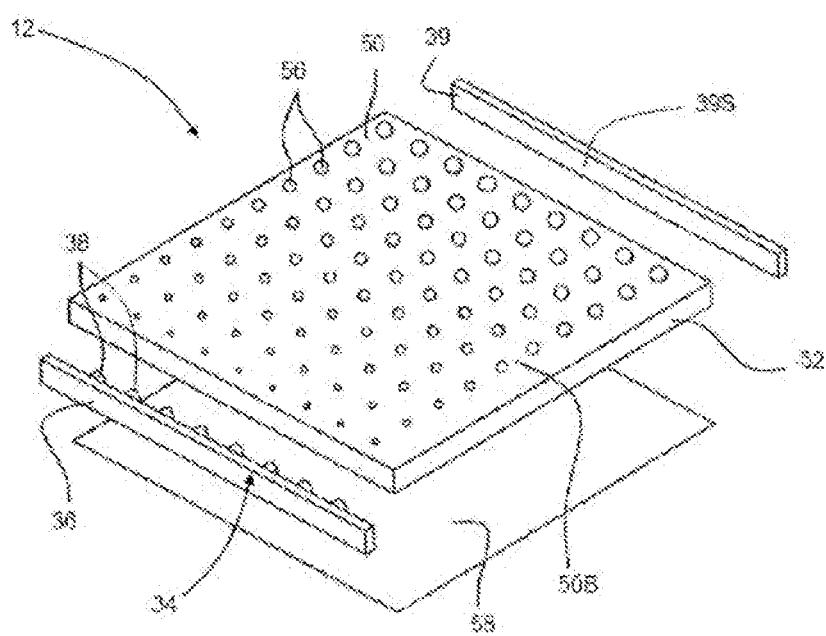
FIG. 5 is a schematic perspective view showing the operating principle of a light guide of the light fixture according to the first embodiment of the invention.

It is possible, for example, to provide points that are smaller near the light source 34 and larger moving away, as shown very schematically in FIG. 5. As a variant, only the density of light exit points can be varied and not the size of the points.

As emerges from the detailed description of the light fixture 12, in this preferred embodiment of the invention, the first optical path C1 is indirect because the visible light beam V undergoes several reflections, in particular inside the guide 50 (multiple reflections on inner walls of the guide) and on the reflective inner surface 42 of the reflector 40.

Preferably, the light fixture 12 further comprises a diffuser 58, for example extending substantially at the lighting window 32 to further improve the uniformity of the lighting in terms of visible light.

Furthermore, advantageously, this light fixture 12 forms an optical relay for two-way data transmission between the Li-Fi module 60 suitable for transmitting and/or receiving an infrared IR light beam modulated by data to be transmitted according to Li-Fi technology and a remote terminal 16. The principle of Li-Fi technology is based in a well-known manner on the encoding and sending of data via the amplitude modulation of an infrared or visible light source (scintillation imperceptible to the eye), according to a well-defined and standardized protocol.

Within the meaning of the present invention, infrared light is understood to mean light with wavelengths comprised in the near-infrared radiation spectrum comprised for example between about 700 to 1000 nanometers up to 2500 nanometers.

According to the invention, this Li-Fi module 60 is suitable for transmitting and/or receiving an infrared IR light beam modulated by data to be transmitted according to a downlink signal originating from the telecommunication network 14 to the remote terminal 16 or according to an uplink signal originating from the remote terminal 16 to the telecommunication network 14. The infrared IR light beam comprises wavelengths for example greater than 850 nanometers and preferably between 850 nanometers and 950 nanometers.

In the example shown in the figure, the Li-Fi module 60 is in the form of a housing 62 comprising a connector 64 for connecting to the telecommunication network, for example an RJ45 jack referenced 80.

This Li-Fi module 60 further comprises a transmitter 68 of a signal modulated by data to be transmitted comprising for example a light source emitting in the infrared spectrum. The Li-Fi module 60 also comprises a receiver 66 of a signal modulated by data to be transmitted comprising a photoreceiver 66 sensitive to infrared light.

In general, the generic Li-Fi module 60 comprises an electronic board whereupon a certain number of electronic components grouped together into a Li-Fi receiving module are mounted to form the Li-Fi receiver 66, a Li-Fi transmitting module to form the Li-Fi transmitter 68 and also a module (not shown) for processing the data signals. Such a processing module makes it possible, in this example, to process so-called uplink or downlink data signals, according to at least one communication protocol of the telecommunication network.

To this end, according to the invention, the light fixture 12 defines a second optical path C2 for propagating an infrared IR light beam inside the receptacle 30 to the lighting window 32 to form an optical channel for transmitting two-way data by Li-Fi through the receptacle 30 of the light fixture 12.

Preferably, this second optical path C2 is direct, that is, it generally follows a path along a rectilinear direction, for example extending between the back wall 30B and the front wall 30A of the panel 12.

In particular, the light fixture 12 further comprises a spectrally selective optical component 70 between the visible and infrared spectra, arranged at an intersection I of the two optical paths C1 and C2.

This component 70 is configured so as to transmit the light beam V or IR propagating along one of said optical paths, respectively C1 or C2, and to reflect the other light beam IR or V propagating along the other of said optical paths, respectively C2 or C1, to combine the two visible V and infrared IR light beams between the optical component 70 and the lighting window 32.

Preferably, the optical component 70 comprises a high-pass optical filter configured to allow a light beam IR in the infrared spectrum to pass and reflect a light beam V in the visible spectrum. For example, the high-pass optical filter 70 has a cutoff wavelength between about 770 nanometers and 800 nanometers.

Preferably, the optical component 70 is in the form of a dichroic plate or a dichroic mirror. The component 70 for example has an optically structured surface 72 for dispersing optical rays of the reflected light beam V so as to promote the redirection of the optical rays toward the lighting window 32.

The component 70 is preferably arranged on the back wall 30B of the light fixture 12. For example, the component 70 is arranged on the back wall 30B so as to have the reflective surface 72 on the side of an inner face of the back wall 30B. Preferably, the component 70 extends over the entire thickness of the back wall 30B so as to completely pass through the thickness of the back wall 30B. In this case, the back wall 30 is opaque to infrared light and visible light and the optical component 70 delimits a region of the back wall 30B to allow the infrared light to pass from the outside of the receptacle 30 to the inside of the receptacle 30.

Preferably, the Li-Fi module 60 extends upstream of the optical component 70 along the second optical path C2, considering a downlink direction between the Li-Fi module 60 toward a remote terminal. For example, the Li-Fi module 60 is placed on the back wall 30B on the side of a face external to the back wall 30B in line with the optical component 70. In this arrangement, the Li-Fi module 60 is invisible to the user when the latter looks toward the front wall 30A of the light fixture 12.

In a variant that is not shown, it is possible to consider integrating the Li-Fi module 60 inside the receptacle 30, the Li-Fi module 60 then having to be arranged so that at least the socket 64 remains accessible from the outside of the receptacle 30.

In the first embodiment of the invention, the optical component 70 extending into a region 44 of the receptacle 30 located substantially at the intersection I of the two optical paths C1, C2. Therefore, in this region 44, the visible light beam V propagating along the first optical path C1 is reflected predominantly by the optical component 70 and the infrared light beam IR propagating along the second optical path C2 is transmitted predominantly by the optical component 70.

For example, in the intersection region 44, the reflector 40 is provided locally with a recess configured to receive the optical component 70.

Preferably, in this first preferred embodiment of the invention, the diffuser 58 is locally perforated in an area of intersection 59 of the diffuser 58 with the second optical path C2. This allows minimal disruption of the data-bearing infrared light beam while having no effect on the appearance of uniformity of the surface panel. Interrupting a diffusion portion locally on the diffuser 58 is not perceptible to the naked eye under normal usage conditions of the light fixture 12. However, it is desirable to provide a layer that is transparent to the visible spectrum and to the infrared spectrum that covers the exterior of the diffuser 58 in order to make it tight to impurities and dust.

Figure 6:
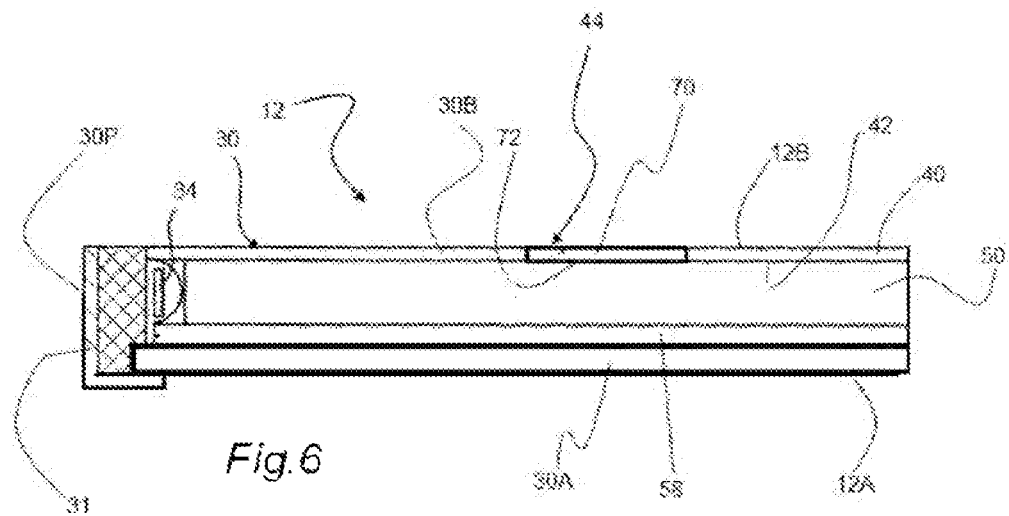
FIG. 6 is a cross sectional view of the light fixture of FIG. 1.

However, preferably, as shown in FIG. 6, which shows a cross sectional view of the panel 12, the front wall 30A comprises a glass pane that is transparent in the infrared spectrum and in the visible spectrum so as to form a closed housing that is tight to dirt deposits or dust on the inner members of the light fixture 12.

FIG. 9 shows a light fixture according to a second embodiment of the invention. In this second embodiment, the elements similar to the first embodiment bear identical references.

As shown in FIG. 9, the light fixture 12 comprises a receptacle 30 provided with a back wall 30B and an opposite front wall 30A as well as a peripheral wall 30P. The front wall 30A generally delimits a lighting window 32.

In particular, the receptacle 30 delimits the exterior dimensions of the light fixture 12, which for example has a parallelepiped shape in the form of a tile. However, the peripheral wall 30P may have an annular shape or else have other geometries.

For example, the back wall 30B and the front wall 30A are interconnected by this peripheral wall 30P. It is therefore understood that the back wall 30B and the front wall 30A may have a general shape corresponding to the cross section of the peripheral wall 30P in a direction transverse to this wall 30P.

Additionally, in the example shown, the front wall 30A comprises a diffuser 58.

The light fixture 12 further comprises a light source 34 arranged inside the receptacle 30. The light source 34 comprises a plurality of light-emitting diodes 38, which are for example in the form of one or more arrays of diodes 38.

In this second embodiment, the light source 34 is arranged on an inner face of the back wall 30B. Additionally, in this second embodiment, at least one inner face of the receptacle 30 reflects visible light. Preferably, the receptacle 30 comprises an essentially reflective inner surface 42 forming the reflector 40. For example, the receptacle 30 is made of a metallic material reflecting visible light.

The receptacle 30 is provided inside its volume as a multidirectional reflector of visible light emitted by the light source 34, mainly by a multidirectional scattering phenomenon of the light emitted by the light source 34. For example, each light-emitting diode 38 may comprise a primary optic diffusing the light emitted by each of the diodes in a multidirectional manner which is reflected on the inner faces of the receptacle 30.

It will be understood that, in this second embodiment, it is possible that visible light beams propagate rectilinearly between the back wall 30B and the front wall 30A. However, a non-negligible proportion of the visible light beams emitted by the light source 34 undergoes multiple reflections on the inner surface 42 of the container 30, and in particular toward the back wall 30B.

Thus, in this second embodiment, the first optical path C1 comprises a plurality of reflections on the reflective inner surface 42 of the receptacle 30 toward the back wall 30B. The reflector 40 is thus arranged in the receptacle 30 on the first optical path C1 and is configured to reflect in the visible spectrum mainly in the direction of the lighting window 32.

Like in the first embodiment, preferably, the optical component 70 is arranged on a back wall 30B of the light fixture 12. The reflective surface 72 of the optical component 70 is oriented substantially parallel to the interior face of the back wall 30B. This reflective surface 72 globally behaves like a mirror reflecting visible light. The optical component preferably extends over the entire thickness of the back wall 30B, such that in the region 44, the back wall 30B can be crossed by infrared light passing through the optical component 70.

Thus, in this example, the second optical path C2 extends directly in a substantially rectilinear direction between the back wall 30B and the front wall 30A so that the intersection of the two optical paths C1 and C2 is located at the back wall 30B.

In the example of FIG. 9, the optical component 70 extends in the region 44 of the receptacle 30 located substantially at the intersection (represented by a star) of the two optical paths C1, C2 so that, in this region 44, the visible light beam V propagating along the first optical path C1 is reflected predominantly by the optical component 70 and the infrared light beam IR propagating along the second optical path C2 is transmitted predominantly by the optical component 70.

For example, the optical component 70 is arranged on the back wall 30B in a space devoid of light-emitting diodes 38 of the light source 34.

It will be noted that although in the two embodiments described, the optical component 70 is arranged locally on a wall of the receptacle 30, it may extend extensively over a whole wall of the receptacle and for example form the entire reflector 40.

The operating principle of the communication assembly according to one of the two embodiments of the invention will be briefly described.

It is understood that the invention allows Li-Fi technology to be integrated into a light fixture without harming the quality of the uniformity of the lighting and the overall perception of the light fixture by a user.

Thus, the Li-Fi module 60, by being mounted for example at the rear of the light fixture 12, for example on the back wall 30B, transmits and receives an infrared light beam that can pass through the receptacle 30 at the location of the optical component 70. Since the inner surface 72 of this optical component 70 reflects visible light, the user does not perceive any difference in lighting related to the presence of the Li-Fi module 60.

The invention is not limited to the embodiments described above. Other embodiments within the reach of a person skilled in the art may also be envisaged without departing from the scope of the invention defined by the claims below.

It thus in particular would not depart from the scope of the invention to modify the detail shape of the light fixture.

The invention claimed is:

1. A light fixture suitable for two-way transmission of data by Li-Fi, comprising:
a receptacle delimiting exterior dimensions of the light fixture provided with a front wall comprising a lighting window and an illuminating light source in a visible spectrum, the light fixture defines a first optical path of propagation of a beam of visible light through an interior of the receptacle between the light source and the lighting window,
wherein the light fixture defines a second optical path of propagation of a beam of infrared light through the interior of the receptacle to the lighting window to form a two-way Li-Fi channel for transmission of data, and
wherein the light fixture further comprises an optical component that is spectrally selective between the visible and infrared spectra, placed at an intersection of the two optical paths, the component being configured to transmit the light beam propagating along one of said optical paths and to reflect the other light beam propagating along the other of said optical paths in order to combine the two visible and infrared light beams between the optical component and the lighting window.

2. The light fixture according to claim 1, wherein the optical component comprises an optical filter having a property of allowing a light beam in the infrared spectrum to pass and of reflecting a light beam in the visible spectrum, the optical component being a dichroic plate or a dichroic mirror.

3. The light fixture according to claim 1, wherein the optical component has an optically structured surface for dispersing optical rays of the reflected light beam so as to promote redirection of the optical rays toward the lighting window.

4. The light fixture according to claim 1, forming an optical relay for two-way data transmission between a Li-Fi module suitable for transmitting and/or receiving an infrared light beam modulated by data to be transmitted and a remote terminal, the light fixture delimits a location, extending inside and/or outside the receptacle configured for receiving the Li-Fi module, said location being placed upstream of the optical component on the second optical path considering a downlink direction.

5. The light fixture according to claim 1, wherein the optical component is provided with a surface reflecting the visible light and is arranged on a back wall opposite the front wall, so that the optical component passes through a thickness of the back wall and has the surface on a side of an inner face of the back wall.

6. The light fixture according to claim 1, comprising a reflector arranged in the receptacle on the first optical path configured to reflect in the visible spectrum mainly in a direction of the lighting window, the optical component extending in a region of the receptacle located substantially at the intersection of the two optical paths so that, in this region, the visible light beam propagating along the first optical path is reflected predominantly by the optical component and the infrared light beam propagating along the second optical path is transmitted predominantly by the optical component.

7. The light fixture according to claim 6, wherein the receptacle having a general panel shape, the light source is placed inside the panel to illuminate through the panel along an edge face of a peripheral wall of the panel and the reflector forms a back wall of the panel with which the optical component is coupled in the intersection region.

8. The light fixture according to claim 6, wherein the light source and the optical component are placed on a back wall of the receptacle, the receptacle comprising a substantially reflective inner surface forming the reflector, so that the first optical path comprises a plurality of reflections on the reflective inner surface of the receptacle toward the back wall and the second optical path extends directly between the back wall and the front wall.

9. The light fixture according to claim 1, wherein the first optical path is indirect with a plurality of optical reflections and the second optical path is direct without optical reflections, by extending substantially rectilinearly between a back wall and a front wall of the light fixture.

10. The light fixture according to claim 1, comprising a diffuser for diffusing the visible light through the lighting window, said diffuser being locally perforated in an area of intersection of the diffuser with the second optical path.

11. A Li-Fi data communication assembly comprising:
a light fixture according to claim 1; and
a Li-Fi module suitable for transmitting and/or receiving an infrared light beam modulated by data to be transmitted comprising a connector connecting the module to an external communication network,
wherein the Li-Fi module extends upstream of the optical component along the second optical path considering a downlink direction between the Li-Fi module toward a remote terminal.

* * * * *